Dec. 25, 1951        J. E. POORMAN        2,579,611
KNURLING TOOL
Filed Feb. 3, 1949
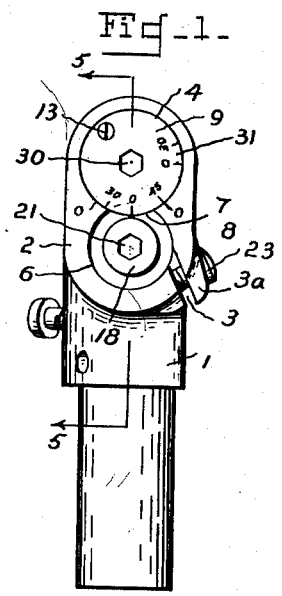
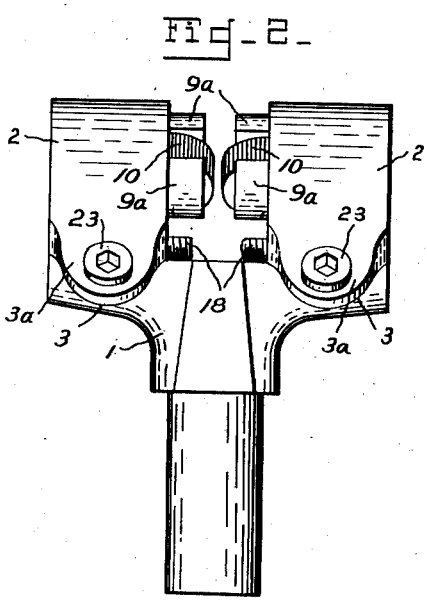
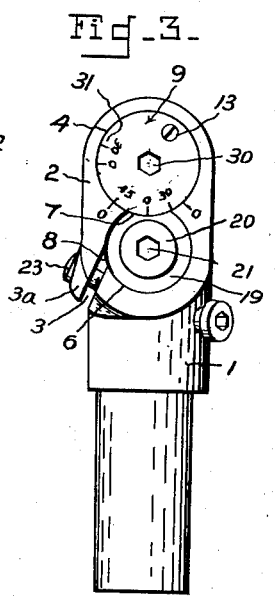
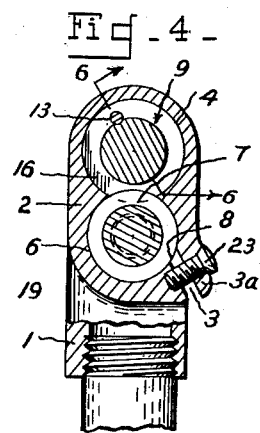
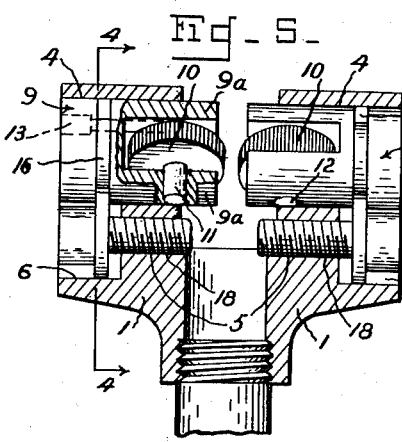
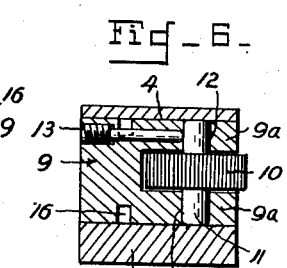
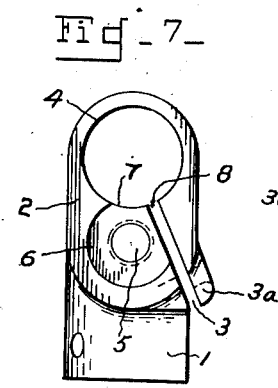
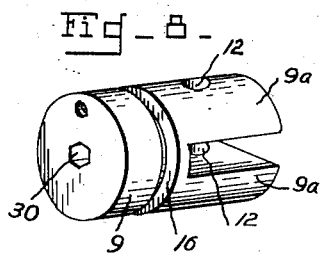
INVENTOR.
John E. Poorman
BY
ATTORNEY Patented Dec. 25, 1951

2,579,611

UNITED STATES PATENT OFFICE 2,579,611

KNURLING TOOL

John E. Poorman, Philadelphia, Pa.

Application February 3, 1949, Serial No. 74,369

2 Claims. (Cl. 80—5.1)

This invention relates to a knurling tool, its primary object being to provide specific means for positively holding the knurling rollers in fixed adjusted position.

I am well aware that it is common in the art to provide means in a tool of this kind to lock the knurling rollers in adjusted position. However, in my long years of experience in working with knurling tools, I have yet to find one provided with satisfactory means for effectually securing the knurling rollers and their supports in adjusted position.

In use, there is terrific strain on the knurling rollers, this strain being reflected in all directions. This means that the journals of the rollers wear rapidly, and the barrels supporting the rollers wear and slip and throw out the desired angle of the knurling teeth on the work operated on.

According to my invention and after practical demonstration in connection with thousands of pieces of work knurled, I finally solved the problem of holding the knurling rollers in fixed adjusted position with limited friction distribution throughout the associated parts, and yet have succeeded in providing the details so simple that set adjustments can be made in a short space of time.

The invention therefore aims to provide a one-piece yoke having aligned bearings and split to readily permit adjustment in one instance of the parts, and in another instance positively fix certain parts in adjusted position.

As is well known in the art, it is highly important that the barrel or bearing supporting the knurling rollers be fixed in minutely adjusted position, both axially and circumferentially. To meet this situation, it is an object of this invention to provide specific means for adjusting the barrels longitudinally and provide means for locking the adjustment through a clamp formed in the supporting yoke.

One of the greatest difficulties to overcome in a knurling tool is to positively hold the roller journals in fixed position. This is due to the friction of the rollers against the work and the angular relation of the cutting corrugations and the very small space on the head to provide locking elements to impinge on the journals. It is an object of this invention to overcome this difficulty by providing screws which extend longitudinally through the barrels to engage the journals, at the same time provide convenient means for making the adjustment from the outer ends of the barrels. By this means, much larger and longer screws can be employed, which obviously provides greater strength and permits of greater force being applied when setting the screws to impinge the journals.

These and other advantages will be hereinafter described and particularly pointed out in the claims.

In the drawing:

Figure 1 is an end view of my improved knurling tool.

Figure 2 is a front elevation.

Figure 3 is an end view looking from the opposite side of Figure 1.

Figure 4 is a section on the line 4—4 of Figure 5.

Figure 5 is a section on the line 5—5 of Figure 1.

Figure 6 is a detail section on the line 6—6 of Figure 2.

Figure 7 is a detail side view of the yoke.

Figure 8 is a detail perspective view of one of the barrels.

Figure 9 is a detail view of one of the screws employed to adjust the barrel longitudinally.

1 indicates a head formed with a yoke to provide two legs 2, each leg being split at 3 to form lips 3a. The legs of the yoke are formed with aligned openings 4—4, while adjacent these openings are other aligned threaded openings 5—5. Outwardly beyond the threaded openings 5—5 and in alignment therewith, the yoke is provided with circular cavities 6—6, the walls of which bisect the openings 4—4 as shown at 7—7 and the splits 3—3 as shown at 8—8.

Mounted in the aligned openings 4—4 are barrels 9—9, each of which is bifurcated at its inner end to provide spaced apart legs 9a—9a to receive a knurling roller 10 mounted on a journal 11 fitted in openings 12 in the legs 9a.

Each journal 11 is positively fixed to the barrel by an elongated screw 13 fitted in a threaded opening located at one side of the center of the barrel and in alignment with one of the legs 9a to impinge the journal supporting the knurling roller. By this arrangement, a more substantial screw can be used, hence greater force can be applied in forcing the screw against the journal, which of course lends toward a greater binding action between the screw and the journal. This increased application of force against the journal insures of the journal being held in its bearings and thus prevents undue wear at this particular point.

Between the bifurcated portion and the outer end of each barrel is an annular groove 16, so located as to be in the range of the bisect portions 7 and 8 of the cavities 6.

A screw 18 is provided with an annular flange 19 and a head 20 formed with a wrench socket 21. There are two of these screws and they engage the aligned threaded openings 5—5 in the yoke. The flanges 19 and the heads 20 fit in the cavities 6—6, and the annular flanges 19 engage the annular grooves 16 in the barrels.

The lips 3a of the legs 2 of the head receive screws 23 to securely clamp the legs 2 around the barrels and the screws 18.

In use, the knurling rollers are fitted in the bifurcated ends of the barrels and the journals 11 are inserted. Then the elongated screws 13 are threaded in their openings and impinge the journals 11 to rigidly hold them in place. The barrels are now inserted in the aligned openings 4, and at the same time the flanges 19 of screws 18 are fitted in the annular groove 16 in the barrels. The screws 18 are now adjusted to advance the barrels toward each other to position the rollers with reference to the work to be operated on. Then the screws 23 are tightened sufficiently to hold the barrels in their longitudinally adjusted position. Then, by means of a wrench inserted in the sockets 30, the barrels are circumferentially adjusted according to the desired angular position of the cutting surfaces of the rollers with reference to the work. This angular position can be determined according to scales 31 on the outer face of the barrels. When the final adjustments are completed, the screws 23 are tightened and the legs 3a effectually clamp the barrels and the flanges 19 of the screws 18.

When these adjustments have been made, the rollers are securely held on their journals and the barrels and the screws are tightly gripped and definitely held in place in the yoke.

What I claim is:

1. In a knurling tool of the type including a pair of spaced split blocks having axially aligned bores with the splits opening into said bores and knurling roller carrying barrels mounted in said bores with their rollers facing each other and secured by clamps compressing the split block portions together, and means for adjusting said barrels axially of their bores including annular grooves in said barrels, threaded bores in said blocks parallel with said barrel receiving bores, the outer ends of said threaded bores being countersunk and laterally communicating with the respective barrel bore, and annularly flanged screws in said threaded bores with their flanges engaging in said annular grooves, the improvement which comprises the positioning of the block splits to intersect the countersunk portions of said threaded bores, whereby the screw flanges are also clamped by the split block portions.

2. A knurling tool comprising a one-piece bifurcated head, the bifurcated portions forming a pair of spaced blocks having axially aligned bores, bifurcated barrels mounted in said bores with their bifurcated ends facing each other, shaft bores in said barrels transverse their bifurcated ends, shafts mounted in said shaft bores and supporting knurling rollers between the bifurcations of said barrels, screw bores longitudinally in said barrels from said shaft bores through the outer ends of said barrels, set screws inserted in said screw bores from the outer ends thereof and engaging said roller shafts, annular grooves in said barrels, threaded bores in said blocks parallel with said barrel receiving bores, the outer ends of said threaded bores being countersunk and laterally communicating with the respective barrel bore, annularly flanged screws in said threaded bores with their flanges engaging said annular grooves for respectively adjusting said barrels axially, said blocks being split with the splits extending from said barrel bores and intersecting the countersunk portions of said threaded bores, means for clamping the split portions of said blocks to secure said barrels and said flanged screws, tool engaging portions on the outer ends of said barrels for angularly adjusting said barrels to selectively position said knurling rollers, and scales on the outer ends of said barrels and blocks for indicating the relative angular adjustment of said rollers.

JOHN E. POORMAN.

REFERENCES CITED

The following references are of record in the file of this patent:

UNITED STATES PATENTS

| Number | Name | Date |
|---|---|---|
| 309,871 | Palmer | Dec. 30, 1884 |
| 532,845 | Tucker | Jan. 22, 1895 |
| 1,422,649 | Bach | July 11, 1922 |
| 1,978,330 | Schlotes | Oct. 23, 1934 |
| 2,359,997 | Lamoreau | Oct. 10, 1944 |
| 2,453,722 | Moss | Nov. 16, 1948 |
| 2,494,073 | Weaver | Jan. 10, 1950 |

FOREIGN PATENTS

| Number | Country | Date |
|---|---|---|
| 2,438 | Great Britain | Jan. 31, 1906 |